United States Patent [19]

Pauty

[11] 4,080,885
[45] Mar. 28, 1978

[54] DOMESTIC ELECTRIC SQUEEZER

[75] Inventor: Bernard Pauty, Fontaine les Dijon, France

[73] Assignee: SEB S.A., Selongey, France

[21] Appl. No.: 719,588

[22] Filed: Aug. 30, 1976

[30] Foreign Application Priority Data

Sep. 11, 1975 France .................................. 75 27908

[51] Int. Cl.² .......................... A23J 1/00; A47J 43/08; H02K 5/10
[52] U.S. Cl. .................................... 99/501; 220/23.86; 310/87
[58] Field of Search ................................... 99/501–505, 99/508, 513; 215/100.5; 220/23.83, 23.86, 4 B; 310/87, 51, 43

[56] References Cited

U.S. PATENT DOCUMENTS

| 2,099,741 | 11/1937 | Klayf | 220/23.86 |
| 3,319,093 | 5/1967 | Abdul | 310/87 |
| 3,575,223 | 4/1971 | Hickel | 99/501 |

FOREIGN PATENT DOCUMENTS 206,381  11/1956  Australia .............................. 99/503

Primary Examiner—Harvey C. Hornsby
Assistant Examiner—Robert Pous
Attorney, Agent, or Firm—Young & Thompson

[57] ABSTRACT

An electric motor driven fruit squeezer has the filter grid depressed in, and positioned in the median plane of the casing.

6 Claims, 8 Drawing Figures

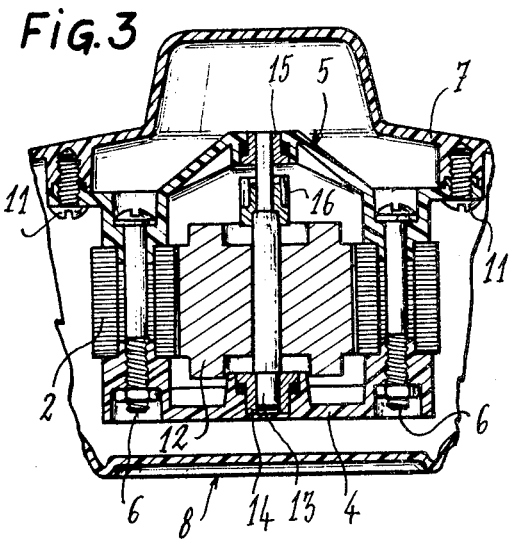
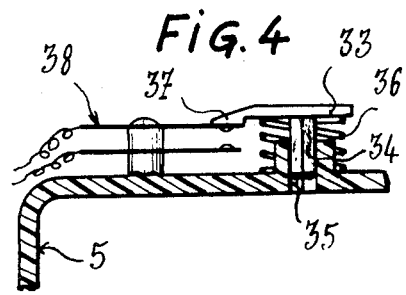
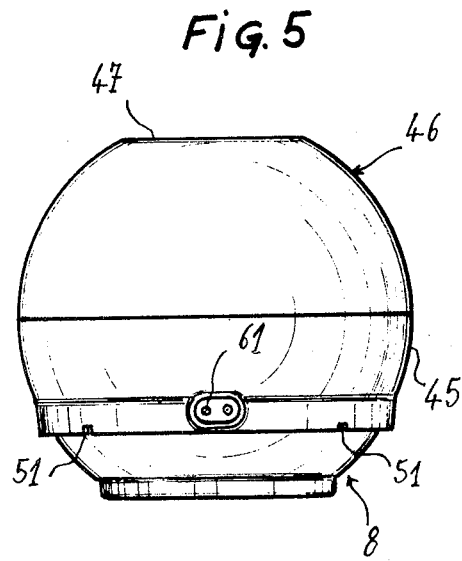
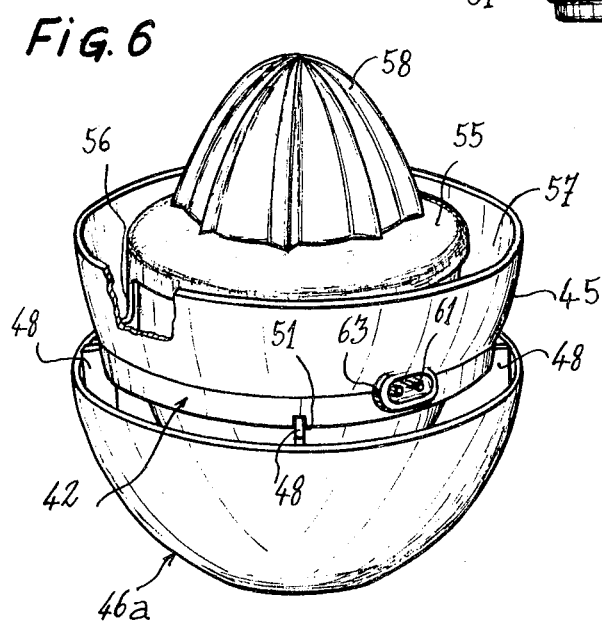

DOMESTIC ELECTRIC SQUEEZER

The invention relates to a domestic electric squeezer for extracting the juice of fruit such as oranges, lemons or grapefuit, the fruits having previously been cut in a substantially diammetrical plane.

Apparatuses of this kind as a rule comprise a rotary member whose shape is similar to that of a paraboloid of revolution which is formed with meridian grooves and against which the cut piece of fruit is applied to squeeze out the juicy pulp. Hereinafter such member will be referred to as a "cone" to conform with current usage.

In the prior art apparatuses the cone is mounted on the upper part of a frame and surmounts a juice-filtering grid below which a receptacle is disposed for the filtered juice. The lower part contains the motor and a step-down device whose output shaft must pass through the stack of aforementioned members to reach the cone. This arrangement results in several considerable disadvantages.

On the one hand, the stacking of the members in height takes up an excessive amount of space which prevents convenient storage. On the other hand, cleaning after use requires the demounting of the stacked members, and this is a laborious operation which may lead to the apparatus being dropped and broken. Furthermore, the removal of the juice requires the receptacle to be formed with a lateral aperture, so that the apparatus may have to be inclined or an inclined bottom may have to be provided, thus further increasing space occupied in the vertical direction.

It is true that in apparatuses of the kind specified the motor casing is generally protected from dirt and need not be cleaned. However, this feature results in neglect of the hermeticity of the casing, so that when cleaning has to be carried out the user runs the risk of introducing water into the motor and therefore causing harmful short-circuiting.

One demand at present made on squeezers is that they can be used with fruits of very different sizes, such as lemons and grapefruit. It is known to construct sets of three cones of stages dimensions which can be fitted into each other, the smallest cone being as a rule permanently fixed on the shaft. However, experience shows that a set of two cones would be enough, and this would be an important saving, but it is made difficult by the fact that in that case the cones must be of rather different dimensions, and this complicates the problem of their interengagement.

It is an object of the invention to provide a squeezer which takes up only a little space, which is in one piece as regards its essential elements and can be immersed as a whole without disadvantages, the squeezer also being economical to manufacture and easy to handle.

The invention provides a domestic electric squeezer, comprising a motor in a casing for actuating a shaft via step-down means, at least one pressing cone mounted on the shaft, a filter grid for the extracted juice, a receptacle for collecting the filtered juice and a cover to protect the apparatus when not in use, characterised in that the grid is unitary with the motor casing, depressed in relation to the motor casing and disposed substantially in the median plane of such casing.

The unitary nature of the apparatus considerably simplifies handling, since there are no members to be demounted, except the cover. Moreover, the depressed position of the grid considerably reduces the space occupied vertically, since only the pressing cone is added to the space taken up by the motor casing.

Preferably, the casing comprises a dome in which at least part of the step-down means are accommodated, the dimensions of the dome being such that it is so enveloped by the pressing cone that the space occupied vertically is further reduced.

According to a particular feature of the invention the casing comprises means for receiving the reversed cover which forms a base for the squeezer, and means for guiding and filtered juice to directly above the cover forming the juice receptacle.

The receptacle stage has therefore been suppressed as such, and so has the grid stage, resulting in a further important contribution towards the reduction of the space occupied in the vertical direction.

In an advantageous embodiment of the invention the motor casing is completely closed, sealing-tight and immersible, so that cleaning is considerably simplified, only the cover and the sealing-tight casing being immersed in the water.

In one embodiment of the invention the grid is formed by inclined bars directed towards the outside of the apparatus and co-operating with a skirt encircling the outside of the grid. The bars of the grid and the skirt thus form guide means for the juice to bring it to directly above the cover placed in the base position.

Other features and advantages of the invention will be gathered from the following detailed description with reference to the accompanying non-limitative exemplary drawings, wherein:

FIG. 3 is a partial section, taken along the line III-—III in FIG. 1;

FIG. 4 is a partial section, to an enlarged scale, taken along the line IV—IV in FIG. 1;

FIG. 5 is an external elevation of the squeezer with the cover in place and in the inoperative position;

FIG. 6 is a perspective view of the squeezer ready to start operation, with the cover turned over into the base position;

Figure 1:
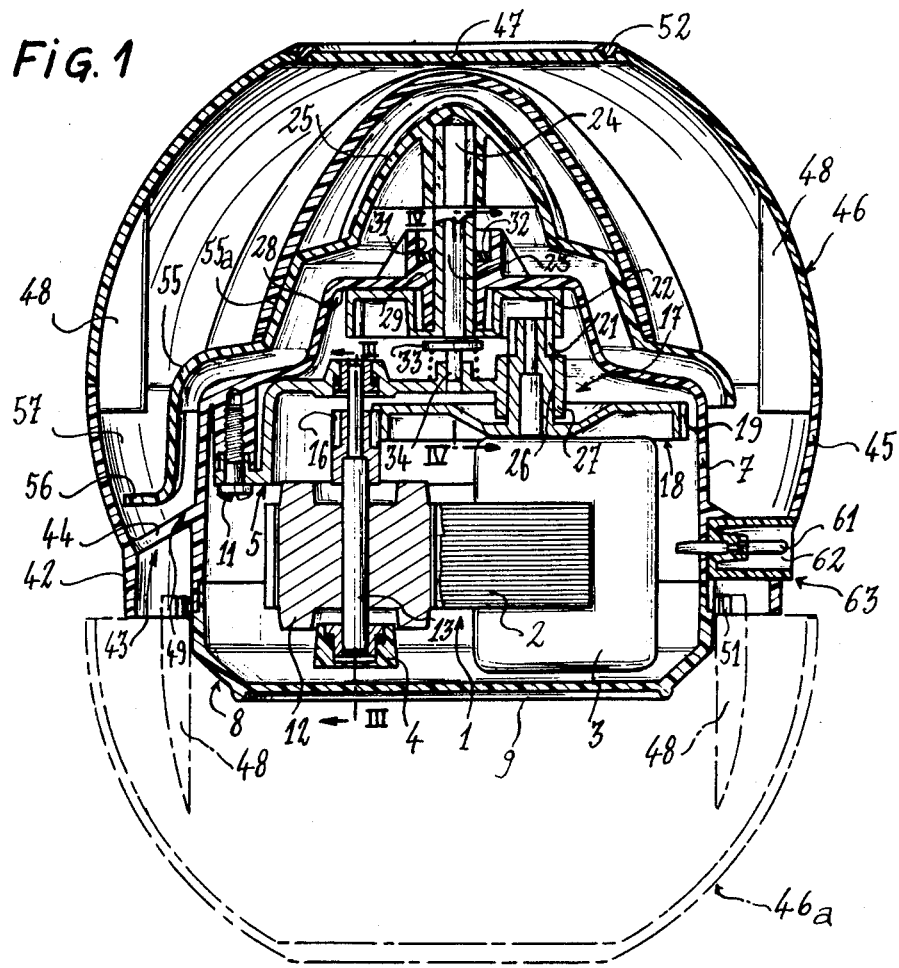
FIG. 1 is a sectioned elevation of a squeezer according to the invention.
Figure 2:
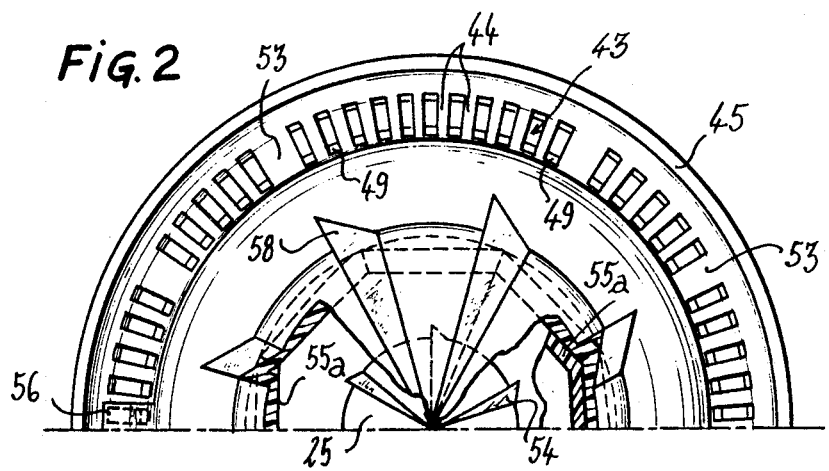
FIG. 2 is a half plan view of the squeezer, with the cover removed, the large pressing cone being partially torn away.

Referring to the drawings, a squeezer comprises an asynchronous motor 1 whose stator 2 comprises a winding 3 and which is kept clamped between a base 4 and a frame 5 by a screw 6. The frame 5 is attached by screws 11 to cover 7 of a substantially cylindrical casing 8 whose base 9 is assembled in sealing-tight relationship with the cover 7.

The electric supply to the motor 1 is via two pins 61 inserted in sealing-tight relationship in the casing 8, for instance, by ultrasonic technique or by a force fit. To be protected from shocks, the pins 61 are disposed in a hollow 62 of a boss 63 on the casing 8. The boss 63 forms an integral part of a casing 8, but it might also be applied by fitting it on, gluing or welding, as shown in FIG. 1.

The motor 1 also comprises a rotor 12 connected to a spindle 13 borne by bearings 14, 15 attached to the base 4 and frame 5 respectively. The spindle 13 has a pinion 16 engaging with a step-down system 17 which comprises a toothed rim 18 with two stages: one large-diameter stage 19 externally meshing with the pinion 16, and a small-diameter stage 21. The stage 21 meshes with an internally toothed rim 22 connected to a spindle 23 substantially coaxial with the casing 8. The end 24 of the pinion 23 is hexagonal and bears a pressing cone 25.

Figure 7:
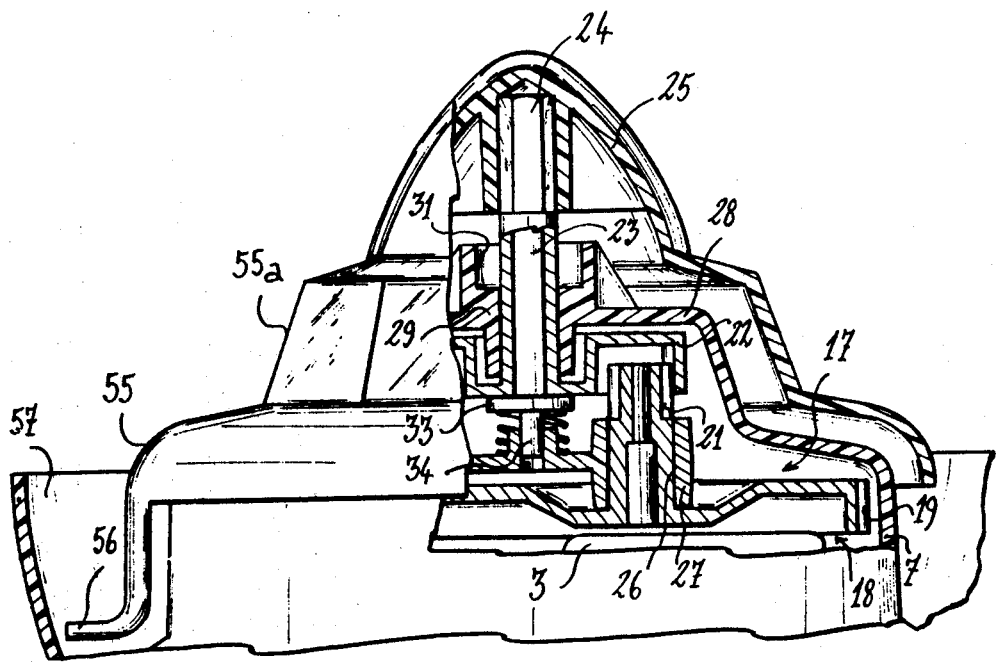
FIG. 7 is a partial sectional view, to an enlarged scale, of part of FIG. 1, the large cone being withdrawn and the squeezer being in the operating position.

The rim 18 comprises, between the stages 19 and 21, a smooth portion 26 which slides freely in a bearing 26 devised in the frame 5. Moreover, the outside diameter of the stage 21 is not larger than that of the bearing 27, so that the rim 18 can be mounted in the bearing 27, although it is made in one piece. The result is that in the inoperative stage, with the squeezer in its normal position, the rim 18 rests on the winding 3. The meshing of the pinion 13 and stage 19 is helical, so that during operation the rim 18 tends to be lifted off the winding 3 (FIG. 7).

The rim 22 and the stage 21 of the rim 18 are received in a dome 28 devised in the upper part of the cover 7 and having a diameter substantially smaller than that of such cover. The spindle 23 is mounted to slide freely in a bearing 29 devised in the dome 28 and having a circular cavity 31 receiving a lipped joint 32 adapted to ensure the sealing-tight emergence of the spindle 23. Any other sealing joint, such as a toroidal one, might be provided without exceeding the scope of the invention.

In its lower part the spindle 23 rests on a piston 33 (FIG. 4) comprising a square rod 34 sliding in a square hole 35 devised in the frame 5, such piston resting on a spring 36 bearing against the frame 5. The piston 33 also has a lug 37 adapted, when lowered, to close a contact 38 with strips which is mounted in series on the supply of the motor 1. Clearly, when a pressure is exerted on the pressing cone 25, the spindle 23 slides, causing the piston 33 to be lowered, and thus closing the supply circuit of the motor 1. Evidently, any other device than the square rod 34 which is adapted to prevent the piston 33 from rotating could be used without exceeding the scope of the invention.

Disposed around the casing 8 and substantially in its median plane is a skirt 42 connected to the casing 8 via a grid 43 formed by bars 44, the casing, grid and skirt forming a unitary assembly. The skirt 42 is continued upwards by a flange 45 adapted to act as a rest for a cover 46 of substantially semi-spherical shape and having at its centre a preferably slightly hollow flat 47. Ribs 48 connected to the cover 46 enable it to be centred on the flange 45.

Figure 8:
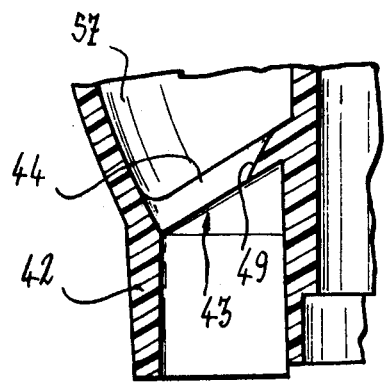
FIG. 8 is a view, to an enlarged scale, of a part of FIG. 1 showing as a detail an aperture of the grid.

The bars 44 of the grid 43 are clearly inclined downwards in the direction from the casing to the skirt 42, and they can be so spaced-out that the grid retains the pips of the fruit treated and also large fragments of shredded pulp. The space between each bar is partially closed (FIG. 8) adjacent the casing 8 by a cast-on lug 49 extending downwards at an angle. The inclination of the bars 44 and lugs 49 is so determined in known manner that all the juice coming from the cover 6 is guided by capillary tension towards the skirt 42 and without the risk that it will flow along the base 9.

The skirt 42 is formed with notches 51 receiving the ribs 48 to the cover 46 when the latter is turned over and it is placed in the base position of the squeezer (reference 46a in FIGS. 1 and 6). The diameter of the skirt 42 is substantially smaller than that of the edge of the cover 46, so that the skirt is entirely included inside the perimeter of the cover when placed as shown at 46a. However, the difference is so small that in this position the skirt edge is inaccessible to the user's fingers. The flat 47 is enclosed by a bead 52 of antiskid material, for instance, neoprene, to ensure a stable seating of the squeezer thus disposed in a working plane. To ensure satisfactory mechanical behaviour when the fruit is squeezed on the apparatus, certain bars, as 53, are reinforced by filling the space between two adjacent bars. Preferably the bars comprise those which are situated in line with the notches 51.

The pressing cone 25 is formed with meridian grooves 54 disposed in known manner to shred the pulp during rotation. The pressing cone 25 can be detached by sliding on the hexagonal spindle 24 for the cleaning of the apparatus after use. The cone 25 is relatively small, since it is adapted for squeezing lemons and small oranges. The cone is continued downwards by the skirt 55 of substantially larger diameter which extends above the dome 28 at the cover 7 of the casing 8. A scraping finger 56 connected to the skirt 55 engages in a gutter 57 formed between the flange 45 and the cover 7 and extends to near the grid 43. A number of fingers, as 56, could be provided spaced over the periphery of the skirt 55 without exceeding the scope of the invention.

The skirt 55 has an external hexagonal configuration 55a to co-operate with a complementary internal configuration of another detachable pressing cone 58 which fits over the cone 25. The cone 58 is substantially larger than the cone 25 and is adapted to the squeezing of large oranges and small grapefruits. This hexagonal configuration is given merely by way of example, and some other configuration might be adopted without exceeding the scope of the invention.

The apparatus thus described operates as follows: After the cover 46 has been withdrawn, it is turned over and placed in the working plane in position 46a so that it rests on the antiskid bead 52, the squeezer being placed thereabove by engaging the notches 51 in the ribs 48 (FIG. 6). In dependence on the size of the fruit to be squeezed, either the large cone 58 can be left in place engaging with the skirt 55, or the cone 58 can be withdrawn to use the cone 25. When the pins 61 have been connected to the mains via a suitable cord, the cut fruit is squeezed on to the selected pressing cone, the result being to cause the spindle 23 to descend in the bearing 29 and provide a supply to the motor 1 as explained hereinbefore (FIG. 7). During this operation the mechanical behaviour of the assembly is ensured by the reinforcement of the grid 43 disclosed hereinbefore. Moreover, the antiskid bead 52 prevents the assembly from starting to rotate as a result of the motor torque.

The pulp, shredded by the grooves in the cone, gives up juice which flows over the skirt 55 and drops on to the grid 43, which retains the pips and large fragments of pulp. Due to the inclination of the bars 44, the juice is guided along the bars in the direction of the skirt 42 where it drips down into the cover 46 placed in the base position 46a. The juice dropping between the bars 44 is guided by the lugs 49, so that it is quite unable to trickle along the casing 8, which remains clean. During the operation the user holds the squeezer with one hand, and the result of the slight clearance between the skirt 42 and the edge of the cover 46 is that the user cannot touch the skirt 42 and get his fingers dirty. To prevent the grid 43 from getting clogged by retained particles, the squeezing finger 56 constantly stirs up such particles.

When squeezing has been completed, the squeezer is disengaged from the cover 46 and placed on the working place without any risk or dirtying, since the casing 8 has remained clean. Then the juice is taken from the cover 46 acting as a receptacle.

After use there are only three members to be cleaned: the cover 46, the unitary assembly of the squeezer and the cone used. However, if the large cone has been used, it is preferable to clean the small cone also, since pieces of pulp may always get under the small cone, or between the two cones. The cleaning can be carried out by instantaneous rinsing by immersion or under a jet.

The invention therefore enables a squeezer to be constructed which occupies a very small amount of space in the vertical direction, due on the one hand to the depression of the grid 43 and on the other to the suppression of the receptacle stage as such. The result is that it can be put away much more tidily.

Moreover, the reduction to three demountable members appreciably simplifies the handling of the apparatus and contributes towards facilitating cleaning, which is made even easier by the immersible nature of the motor casing. The other arrangements described make possible use satisfying all requirements of cleanliness.

Finally, the reduction of the number of cones to two to cover practically the whole range of citrus fruits is made possible by mutual interengagement, without having to use an excess of expensive material, by the use of the hexagonal outline 55a of the skirt 55.

Clearly, the invention is not limited to the example described and the means used might be varied in construction in many ways, inter alia in the ways mentioned in the description, without exceeding the scope of the invention.

I claim:

1. A domestic electric juice squeezer, comprising an encased motor, a shaft rotated by said motor via step-down means, at least one juice pressing cone mounted on the shaft, a grid for filtering the extracted juice, a receptacle for collecting the filtered juice and a cover for protecting the apparatus when not in use, the grid being unitary with the motor casing, said grid comprising spaced radial bars inclined downwardly toward the outside of the apparatus and secured to a skirt extending in a circle around the outside of said grid, thereby permitting the juice to be guided toward said skirt, spaces between said grid bars being partially closed adjacent the casing by lugs inclined downward so as to prevent said juice from trickling along said casing, the motor being disposed in a casing which is completely closed and sealed, the shaft passing out through the casing, and sealing means on the shaft outlet through the casing, whereby the motor casing is thereby permitting the grid to be washed by complete immersion of the motor casing.

2. A squeezer according to claim 1, wherein the cover is provided with fixing means to cooperate with notches in the lower part of said skirt when said cover is placed in inverted position to serve as receptacle for the juice, and to cooperate with the upper part of said skirt when the cover is in its covering position.

3. A squeezer according to claim 2, wherein the diameter of said skirt is less than the diameter of the cover, the difference of said diameters being smaller than the size of the fingers of a user.

4. A squeezer according to claim 3, wherein the grid is depressed relative to the motor casing and located substantially in the horizontal median plane thereof, said casing comprising a dome which extends inside the pressing cone.

5. A squeezer according to claim 2, wherein certain bars of the grid are reinforced.

6. A squeezer according to claim 2, wherein the cover comprises anti-skid means to prevent it from rotating when it is in the base position and the motor is operating.

* * * * *